(12) United States Patent
Joseph et al.

(10) Patent No.: US 9,826,444 B2
(45) Date of Patent: Nov. 21, 2017

(54) MANAGING HANDOVERS DURING A SUSPENDED TRANSMISSION (STX) AT A BASE STATION

(71) Applicant: QUALCOMM Incorporated, San Diego, CA (US)

(72) Inventors: Vinay Joseph, San Diego, CA (US); Yeliz Tokgoz, San Diego, CA (US); Damanjit Singh, San Diego, CA (US); Amir Aminzadeh Gohari, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/169,442

(22) Filed: May 31, 2016

(65) Prior Publication Data

US 2017/0150408 A1    May 25, 2017

Related U.S. Application Data

(60) Provisional application No. 62/257,642, filed on Nov. 19, 2015.

(51) Int. Cl.
*H04W 36/00* (2009.01)
*H04W 36/16* (2009.01)
(Continued)

(52) U.S. Cl.
CPC ....... *H04W 36/0083* (2013.01); *H04W 24/10* (2013.01); *H04W 36/16* (2013.01); *H04W 76/046* (2013.01); *H04W 76/048* (2013.01)

(58) Field of Classification Search
CPC .............. H04W 84/045; H04W 24/02; H04W 36/0061; H04W 36/0083; H04W 24/10; H04W 36/30; H04W 36/04
See application file for complete search history.

(56) References Cited

U.S. PATENT DOCUMENTS

| 8,271,041 B2 | 9/2012 | Tanigawa et al. |
| 9,155,121 B2 | 10/2015 | Rayavarapu et al. |

(Continued)

FOREIGN PATENT DOCUMENTS

| EP | 1467589 A2 | 10/2004 |
| GB | 2445398 A | 7/2008 |

(Continued)

OTHER PUBLICATIONS

International Search Report and Written Opinion issued in International Patent Application No. PCT/US2016/061580, dated Feb. 3, 2017 (14 pages).

*Primary Examiner* — Nam Huynh
(74) *Attorney, Agent, or Firm* — Arent Fox LLP

(57) ABSTRACT

The present disclosure describes a method, an apparatus, and a computer readable medium for managing handovers at a base station. For example, the method may include receiving a request for STX to one or more connected user equipments (UEs), identifying whether one or more conditions have to be satisfied prior to initiating of the STX, and determining whether the one or more conditions are satisfied. The example method further includes initiating the STX at the base station in response to the identifying and the determining and performing a corrective action for managing the handovers in response to the initiating of the STX.

27 Claims, 10 Drawing Sheets

(51) Int. Cl.
*H04W 76/04* (2009.01)
*H04W 24/10* (2009.01)

(56) References Cited

U.S. PATENT DOCUMENTS

| | | |
|---|---|---|
| 2014/0073328 A1 | 3/2014 | Ho et al. |
| 2014/0362717 A1 | 12/2014 | Koskinen et al. |
| 2015/0334625 A1 | 11/2015 | Banks et al. |

FOREIGN PATENT DOCUMENTS

| | | | |
|---|---|---|---|
| JP | 2013157974 A | 8/2013 | |
| WO | WO-2008096240 A1 | 8/2008 | |
| WO | WO 2013107494 A1 * | 7/2013 | ............ H04W 24/10 |

\* cited by examiner

MANAGING HANDOVERS DURING A SUSPENDED TRANSMISSION (STX) AT A BASE STATION

CLAIM OF PRIORITY

The present application for patent claims priority to U.S. Provisional Patent Application No. 62/257,642, filed Nov. 19, 2015, entitled "Managing Handovers during a Suspended Transmission (STX) at a Base Station," which is assigned to the assignee hereof, and hereby expressly incorporated by reference herein.

INTRODUCTION

The present disclosure relates generally to communication systems, and more particularly, managing handovers (or handover operations) at a base station.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In a wireless network, a base station may suspend transmission (e.g., also referred to as stop in transmission, suspended transmission, or STX) from the base station for a short duration of time (e.g., ~10 ms, 20 ms, 50 ms, 100 ms, etc.) during a network listen (NL) period. The suspended transmission may cause a sharp drop in instantaneous and/or filtered serving cell measurements maintained by the UEs connected to the base station (also referred to as connected mode UEs). The connected UEs may report these measurements to the base station. The base station may rely on these measurements reported by the UEs and may trigger unnecessary handovers from a current serving base station to a neighbor base station although the neighbor base station is weaker (e.g., in terms of signal strength) than the current serving base station, e.g., by 1-3 dB. In some other instances, the base station may trigger unnecessary and/or even more risky handovers to neighbor base stations even though the neighbor base stations are significantly weaker than the current serving base station, e.g., by 4-9 dB, leading to radio link failures (RLF) at the neighbor base station after the handover from the serving cell.

Therefore, there is a desire to reduce impact of suspended transmissions on connected mode user equipments.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

SUMMARY

Figure 1:
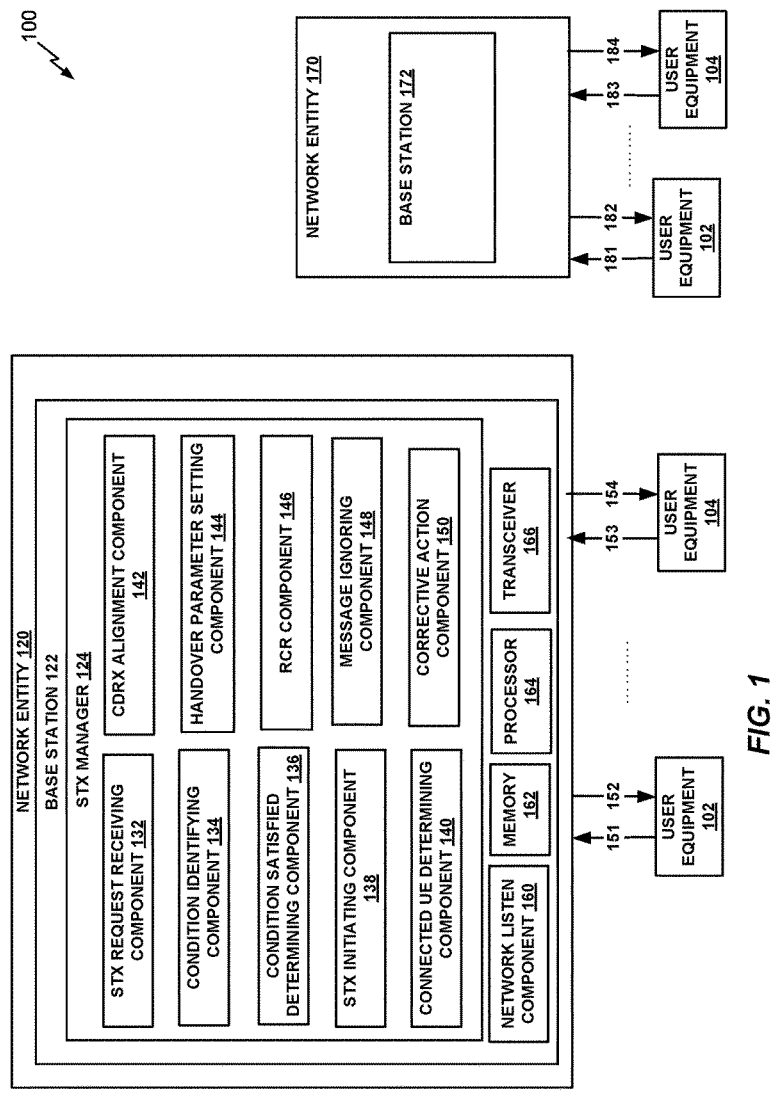
FIG. 1 is a block diagram conceptually illustrating an example of a wireless communications system, in accordance with an aspect of the present disclosure.

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one example, a method for one or more managing handovers (or handover operations) at a base station is provided. The method includes receiving, at the base station, a request for suspended transmission (STX) to one or more connected user equipments (UEs); identifying, at the base station, whether one or more conditions have to be satisfied prior to initiating of the STX; determining, at the base station, whether the one or more conditions are satisfied; initiating the STX, at the base station, in response to the identifying and the determining; and performing, at the base station, a corrective action for managing the one or more handovers in response to the initiating of the STX.

In another example, a base station for managing one or more handovers is provided. The base station includes a memory configured to store data and one or more processors communicatively coupled with the memory, wherein the one or more processors and the memory are configured to receive, at the base station, a request for suspended transmission (STX) to one or more connected user equipments (UEs); identify, at the base station, whether one or more conditions have to be satisfied prior to initiating of the STX; determine, at the base station, whether the one or more conditions are satisfied; initiate the STX, at the base station, in response to the identifying and the determining; and perform, at the base station, a corrective action for managing the handovers in response to the initiating of the STX.

In a further example, a base station for managing one or more handovers is provided. The base station includes means for receiving, at the base station, a request for suspended transmission (STX) to one or more connected user equipments (UEs); means for identifying, at the base station, whether one or more conditions have to be satisfied prior to initiating of the STX; means for determining, at the base station, whether the one or more conditions are satisfied; means for initiating the STX, at the base station, in response to the identifying and the determining; and means for performing, at the base station, a corrective action for managing the handovers in response to the initiating of the STX.

Additionally, in another example, a computer readable medium storing computer executable code for managing one or more handovers at a base station is provided. The computer readable medium includes code for receiving, at the base station, a request for suspended transmission (STX) to one or more connected user equipments (UEs); code for identifying, at the base station, whether one or more conditions have to be satisfied prior to initiating of the STX; code for determining, at the base station, whether the one or more conditions are satisfied; code for initiating the STX, at the base station, in response to the identifying and the determining; and code for performing, at the base station, a corrective action for managing the handovers in response to the initiating of the STX.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

A small cell or a small cell base station or access point may refer, but is not limited to, a femtocell, picocell, microcell, or any other cell or base station having a relatively small transmit power or relatively small (e.g., on the order of meters or 10s of meters) coverage area (e.g., including one or more cells) as compared to a macro cell or macro base station (e.g., having a coverage area on the order of kilometers or tens of kilometers). The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

The present disclosure recites a method, an apparatus, and a computer readable medium for reducing the impact of suspended transmission (STX) at a base station. For example, the present disclosure reduces the impact of STX by managing handovers triggered due to the STX at the base station. In an example aspect, a STX manager at the base station may receive a request for STX from a network listen (NL) component of the base station. The STX manager initiates the STX after determining whether conditions associated with the initiation of the STX are satisfied. Additionally, the STX manager performs a corrective action for managing the handovers triggered due to the STX at the base station.

Specifically, in an aspect, the STX manager may identify at least one condition that needs to be satisfied, and determine whether the condition is satisfied, prior to performing the STX. For instance, the at least one condition may include, but it not limited to, one or more conditions such as determining whether a number of connected UEs is below a threshold and whether a period associated with the initiating of the STX aligns with a connected mode discontinuous reception (CDRX) off period of the connected UEs.

Further, and more specifically, the STX manager may perform at least one or more of the corrective actions (e.g., any combination) subsequent to performing the STX. For instance, the at least one corrective action may include, but it not limited to, one or more corrective actions such as setting handover parameters to new values higher than original values prior to the initiating of the STX and restoring the handover parameters to the original values after the STX is completed; resetting one or more time-to-trigger (TTT) timers at the connected UEs via a radio resource control (RRC) connection reconfiguration (RCR) message to the connected UEs; ignoring handover requests or handover failures occurring within a first time duration of initiating of the STX; ignoring a first set of handover measurement report messages (MRMs) received within a second time duration of initiating of the STX; and ignoring a second set of handover MRMs received during a third time duration of initiating of the STX when a difference between signal strength of a base station and a neighbor base station reported in a MRM is above a threshold.

Thus, based on the present aspects, operation of the STX manager described herein will reduce and/or eliminate unnecessary and/or risky handovers from a serving base station performing an STX to potentially weaker neighbor base stations that may otherwise be initiated due to the effect of the STX on the perceived received signal strength of the serving base station at connected mode UEs.

Referring to FIG. 1, in an aspect, a wireless communication system 100 includes a plurality of user equipments (UEs), e.g., UEs 102 and/or 104 in communication (also referred to as connected mode UEs) with a network entity 120 and/or a base station 122. For instance, in an aspect, when STX is initiated at base station 122, filtered received signal strength measurements (e.g., values of one or more of reference signal received power (RSRP), reference signal received quality (RSRQ), received signal strength indicator (RSSI), received signal code power (RSCP), or any other received signal parameter used in a handover determination) at the UEs may drop and the UEs may trigger handovers from base station 122 to base station 172 although base station 172 is weaker (e.g., a difference of approximately 1-9 dB in received signal strength, although not limited to this range) than base station 122. The handovers may be triggered as it takes time for the filtered received signal strength measurements at the UEs to recover (e.g., increase in value) after the STX at base station 122.

In an aspect, base station 122 may include a STX manager 124 for managing the handovers that may otherwise be triggered due to the STX at base station 122. Base station 122 and/or STX manager 124 may receive a request for STX from a NL component 160 at the base station. The STX manager 124 identifies whether one or more conditions have to be satisfied prior to initiating of the STX and determines whether the one or more conditions are satisfied. These one or more conditions may be to minimize the impact of the STX on STX-induced handovers. The STX manager 124 initiates the STX at the base station based on the identification and the determination as to whether the one or more conditions are satisfied. Further, whether or not any conditions have to be satisfied, the STX manager 124 may additionally perform a corrective action for managing the handovers at base station 122 subsequent to performing the STX. As such, these corrective actions may be post-STX actions that the STX manager 124 may perform to help minimize the impact of the STX on STX-induced handovers.

UEs 102 and/or 104 may communicate with network entity 120 which may include one or more base stations, e.g., base station 122 (also referred to as a cell, a small cell, access point, etc.) and/or network entity 170 which may include one or more base stations, e.g., base station 172 via one or more over-the-air links. For example, UE 102 may communicate with base station 122 via an uplink (UL) 151 and/or a downlink (DL) 152. In an aspect, UL 151 is generally used for communication from UE 102 to network entity 120 and/or base station 122 and DL 152 is generally used for communication from network entity 120 and/or base station 122 to UE 102. In an additional example, UE 104 may communicate with network entity 120 and/or base station 122 via an uplink (UL) 153 and/or a downlink (DL) 154. In an aspect, UL 153 is generally used for communication from UE 104 to network entity 120 and/or base station 122 and DL 154 is generally used for communication from network entity 120 and/or base station 122 to UE 104.

Further, for example, UEs 102 and/or 104 may be handed over to network entity 170 (e.g., during or subsequent to the STX at base station 122) and may communicate with network entity 170, which may include one or more base stations, e.g., base station 172 via one or more over-the-air links. For example, UE 102 may communicate with base station 172 via an uplink (UL) 181 and/or a downlink (DL) 182. In an aspect, UL 181 is generally used for communication from UE 102 to network entity 170 and/or base station 172 and DL 182 is generally used for communication from network entity 170 and/or base station 172 to UE 102. In an additional example, UE 104 may communicate with network entity 170 and/or base station 172 via an uplink (UL) 183 and/or a downlink (DL) 184. In an aspect, UL 183 is generally used for communication from UE 104 to network entity 170 and/or base station 172 and DL 184 is generally used for communication from network entity 170 and/or base station 172 to UE 104.

In an aspect, for example, base stations 122 and/or 172 may be small cell base stations (e.g., small cells). In additional aspects, base station 122 may include a network listen (NL) component or NL module 160 which may include UE-like capabilities (e.g., a transceiver or receiver and receive chain components) that allow the NL component 160 to detect downlink control signals from neighboring base stations (e.g., base station 172) having a coverage area in which the small cell base station is located. The NL component 160 may be configured to listen for and receive over-the-air (OTA) signals from neighboring (or neighbor) base stations and decode the OTA signals transmitted by the neighboring base stations to obtain relevant information. For instance, the NL component 160 may be configured to enable base station 122 to execute various applications, e.g., self-organizing network (SON) applications such as building a neighbor list, physical cell identity (PCI) selection to avoid PCI collisions with neighboring cells, approximate location determination using cell global identity (CGI) of neighboring base stations, time and frequency synchronization, interference management, etc.

In an aspect, the operation of NL component 160 at base station 122 may affect the services provided to the UEs (e.g., UEs 102, 104, etc.) that are connected to base station 122. For example, the NL component 160 of base station 122 may be configured to send a request to STX manager 124 to suspend transmission (STX) at/from base station 122 to the UEs connected to base station 122 (e.g., UEs in a connected mode) during a period (e.g., also referred to as NL period) in which the NL component 160 listens for control signals from neighboring base stations to avoid self-induced interference caused by the transmitter of base station 122. Base station 122 and/or STX manager 124 may suspend transmission based on the request from NL component 160, which may result in service disruptions (or degradation) to UEs connected to base station 122.

Two types of STX-induced service disruptions or degradations may occur due to STX at a base station: scheduled STX and unscheduled STX. Scheduled STX occurs when a UE connected to a serving base station is informed about the STX during a NL period and the UE is generally prepared not to expect transmissions on the DL during the NL period. Unscheduled STX, however, occurs when a UE is expecting transmission from the base station (e.g., base station 122) on the downlink, but the base station initiates STX during the NL period. As a result, during the unscheduled STX, the UE (e.g., UE 102) may experience different levels of service disruption and/or service degradation based on the timing and/or duration of the STX. For example, parameter estimation algorithms used by a UE, such as tracking loops and channel estimations, which filter instantaneous received signal strength estimates every few milliseconds are likely to be disrupted when the STX duration exceeds 10-20 ms. Further, when the STX duration exceeds 50 ms, power control loops used by the UEs may trigger higher uplink power affecting overall network performance. Furthermore, an STX duration exceeding 80 ms may impact delay sensitive traffic, e.g., Voice over IP (VoIP) traffic over Long Term Evolution (LTE) systems. Additionally, a radio link failure (RLF) rate may also increase with increased STX durations.

In order to address the above-noted service issues, the present aspects implement STX manager 124 for managing handovers at the base station 122. Base station 122 and/or STX manager 124 may manage handovers by receiving a request for suspended transmission (STX) to connected user equipments (UEs), identifying whether one or more conditions have to be satisfied prior to initiating of the STX, determining whether the one or more conditions are satisfied, initiating the STX in response to the identifying and the determining, and performing a corrective action for managing the handovers in response to the initiating of the STX.

For example, base station 122 and/or STX manager 124 may identify a condition to be satisfied prior to the initiating of the STX and may determine satisfaction of such condition, such as but not limited to one or any combination of: whether a number of connected UEs is below a threshold (e.g., such that only a minimal number of UEs is affected by the STX); and/or whether a period associated with the initiating of the STX aligns with a connected mode discontinuous reception (CDRX) off period of the UEs (e.g., thereby minimizing the effect of the STX on the UEs); and/or setting handover parameters to higher values prior to initiating of the STX (e.g., thereby making conditions that trigger a handover more difficult to achieve).

Further, for example, base station 122 and/or STX manager 124 may perform one or more corrective actions at the base station 122 subsequent to performing the STX, where examples of the corrective action(s) may include, but are not limited to, one or any combination of: restoring the handover parameters to their original values after the STX is completed; and/or resetting time-to-trigger (TTT) timers via a radio resource control (RRC) connection reconfiguration (RCR) message to the connected UEs; and/or ignoring handover requests or handover failures occurring within a first time duration of initiating of the STX; and/or ignoring, at the base station, a first set of handover measurement report messages (MRMs) received within a second time duration of initiating of the STX; and/or ignoring, at the base station, a second set of handover MRMs received during a third time duration of initiating of the STX.

In an additional aspect, base station 122 and/or STX manager 124 may include one or more of a STX request receiving component 132 for receiving an STX request from NL component, a condition identifying component 134 for identifying whether one or more conditions have to be satisfied prior to performing the STX, a condition satisfied determining component 136 for determining if such one or more conditions are satisfied, a STX initiating component 138 for causing the STX to occur, a connected UE determining component 140 for identifying a number of connected mode UEs at base station 122, a CDRX alignment component 142 for identifying how a duration of a requested STX aligns with an off period of a CDRX of the connected mode UEs, a handover parameter setting component 144 for adjusting a value of one or more handover-related parameters, a RCR component 146 for generating and initiating transmission of one or more RCR messages, a message ignoring component 148 for identifying received messages that may be ignored, and/or a corrective action component 150 for initiating each of the noted corrective actions. Base station 122 and/or STX manager 124 may further include a NL component 160 for performing network listening functions, a memory 162, a processor 164, and/or a transceiver 166 that may communicate with STX manager 124 and its components for managing handovers at the base station.

Further, as described herein, for example, network entities 120 and/or 170 may include, but not limited to, an access point, a base station (BS) or Node B or eNodeB, a macro cell, a small cell (e.g., a femtocell, or a pico cell), a relay, a peer-to-peer device, an authentication, authorization and accounting (AAA) server, a mobile switching center (MSC), Mobility Management Entity (MME), SON management server, OAM server, Home NodeB Management System (HMS), Home eNodeB Management System (HeMS), etc. Additionally, network entities 120 and/or 170 may include one or more of any type of network components that can enable base stations 122 and/or 172 communicate and/or establish and maintain links with UEs 102 and/or 104. In an example aspect, base stations 122 and/or 172 may operate according to Wideband Code Division Multiple Access (W-CDMA), Code Division Multiple Access (CDMA), Time Division Synchronous Code Division Multiple Access (TD-SCDMA), Long Term Evolution (LTE), or Global System for Mobile Communications (GSM) standard as defined in 3GPP Specifications.

Also, as described herein, for example, UEs 102 and/or 104 may be a mobile apparatus and may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Figure 2:
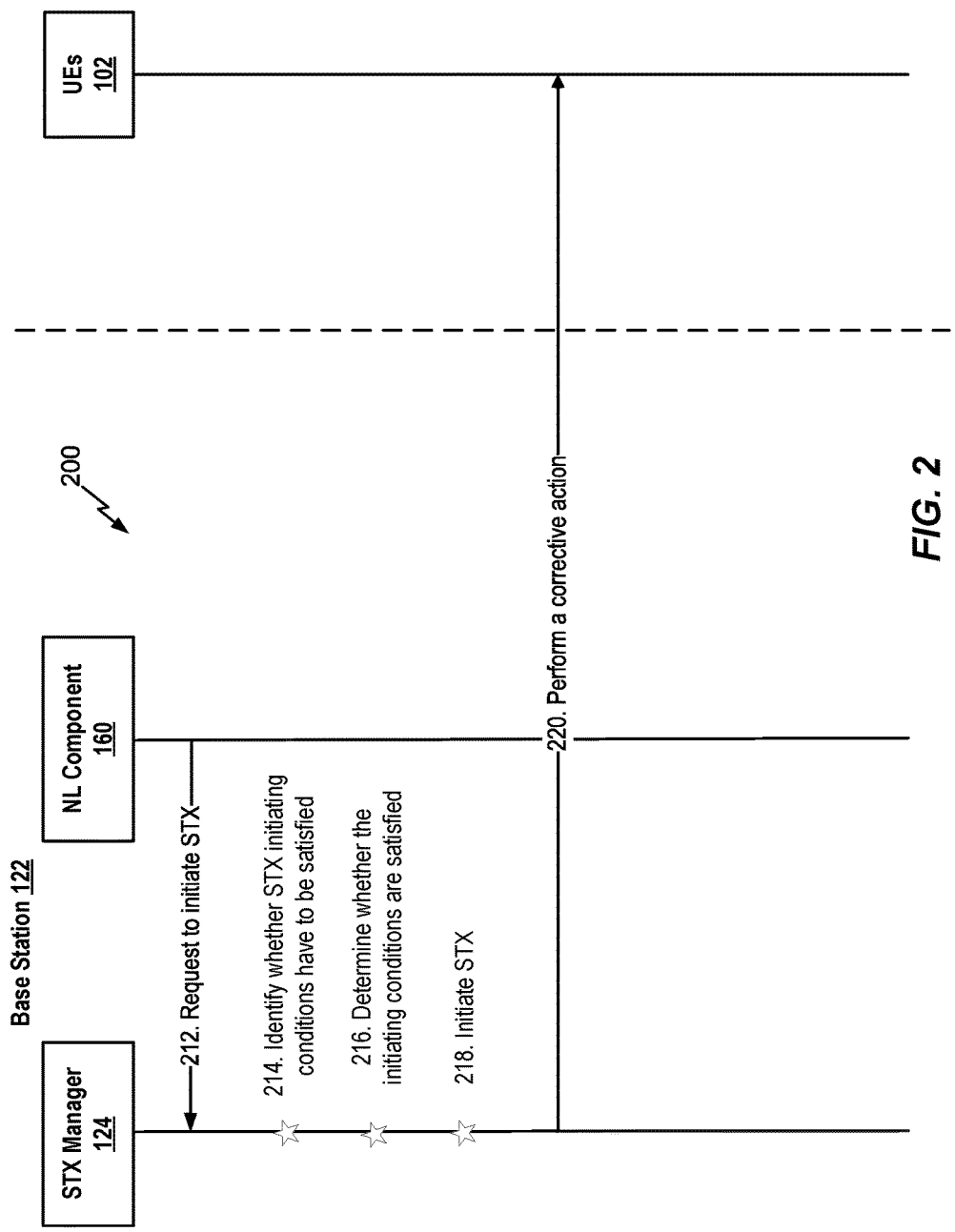
FIG. 2 illustrates an example message flow diagram for managing handovers at a base station, in accordance with aspects of the present disclosure.

FIG. 2 illustrates an example aspect of a message flow diagram 200 for managing handovers at a base station.

At operation 212, base station 122 and/or STX manager 124 may receive a request to initiate a STX at the base station. That is, STX manager 124 may receive a request to suspend transmission on the downlink to the UEs, e.g., a request to suspend transmission on DL 152 to UE 102. The request may be received from NL component 160. For instance, in an aspect, the request to initiate STX at base station 122 may be sent from the NL component 160 prior to the base station entering the NL operation (or at the time of entering the NL operation). In the NL operation, the downlink transmissions from base station 122 are suspended (although temporarily for a short period of time) so that NL component 160 can listen to (e.g., receive) transmissions from neighbor base stations (e.g., base station 172).

At operation 214, base station 122 and/or STX manager 124 may identify whether there are any conditions (e.g., pre-requisites) that may have to be satisfied prior to initiating the STX at the base station. That is, whether any conditions have to be checked to determine if they have to be satisfied prior to initiating the STX. For example, in an aspect, conditions such as number of connected mode UEs (e.g., UEs connected to the base station), alignment of STX period of base station 122 with the CDRX off period of the UEs, etc. may have to be checked to determine if they are satisfied prior to initiating of the STX. These example conditions may be defined by the network operator to reduce, minimize, or eliminate the impact of STX at base station 122.

At operation 216, base station 122 and/or STX manager 124 may determine whether the conditions (e.g., pre-requisites for initiating the STX at base station 122) are satisfied. For instance, in an aspect, in response to identifying that one or more conditions have to be satisfied before performing an STX, STX manager 124 may initiate STX at the base station if the number of UEs connected to the base station is below a threshold. The number of UEs connected to the base station may be determined by sending a query to a controller (not shown) of base station 122. The threshold may be defined (e.g., for reducing the impact of STX at the base station) by the network operator based on a capacity of the base station and/or a type of the base station. For instance, if the base station is a small cell base station, the threshold may be defined or set to a smaller value (when compared to a macro cell base station) by the network operator as the capacity of a small cell base station is smaller than a macro cell base station.

At operation 218, base station 122 and/or STX manager 124 may initiate STX at the base station in response to determining that the one or more conditions for initiating the STX at the base station are satisfied, or that no conditions exist that have to be satisfied. The initiating of the STX at the base station includes suspending downlink transmissions from base station 122 to the UEs which are connected to the base station (e.g., UEs 102 and/or 104). In an aspect, if base station 122 and/or STX manager 124 determines that there are no conditions to be satisfied, base station 122 and/or STX manager 124 may proceed to operation 218. In additional aspect, if base station 122 and/or STX manager 124 determines that the one or more conditions are not satisfied, base station 122 and/or STX manager 124 may reject or delay the initiating of the STX. For instance, base station 122 and/or STX manager 124 may delay the initiating of the STX for one or more transmission time intervals (TTIs).

At operation 220, base station 122 and/or STX manager 124 may perform one or more corrective actions to minimize, reduce, or avoid the performance impact on the UEs connected to the base station, or of the base station itself, due to the STX at the base station as described below in detail in reference to FIG. 4.

Figure 3:
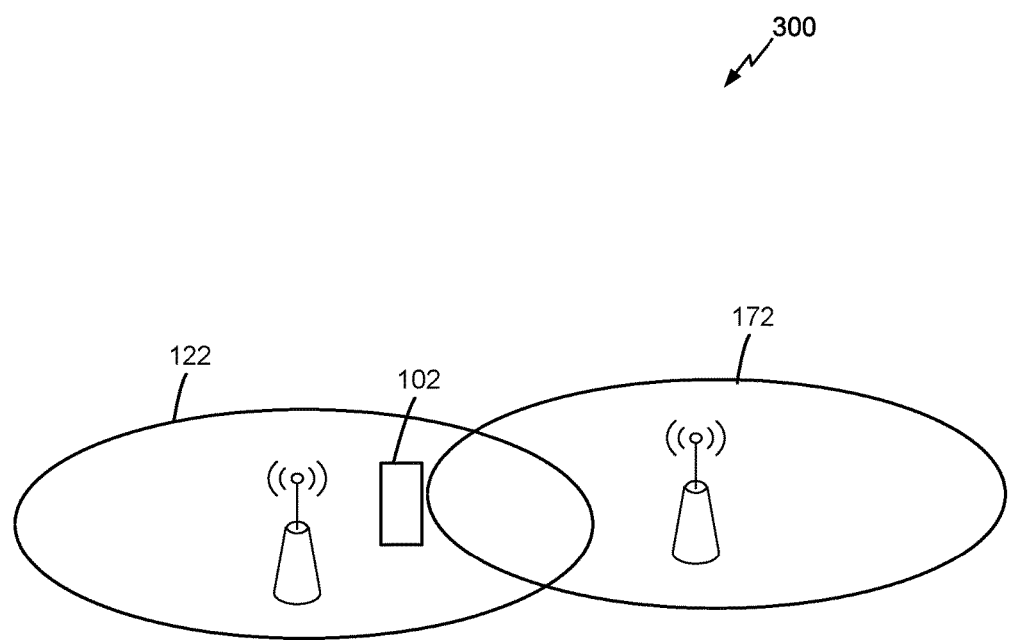
FIG. 3 illustrates an example scenario for managing handovers at a base station, in an aspect of the present disclosure.

FIG. 3 illustrates an example scenario in an aspect of the present disclosure.

For example, FIG. 3 illustrates base stations 122 and 172 as neighbor base stations with overlapping coverage area. UE 102, closer to base station 122, is served by base station 122 (e.g., UE 102 served by base station 122). In an aspect, STX manager 124 may initiate STX at base station 122 which may trigger a handover of UE 102 to base station 172 even though a received signal strength measurement of base station 172 is weaker than the received signal strength measurement of the serving cell (e.g. base station 122), e.g., by 1-9 dB. In an aspect, the handover may have been triggered at UE 102 due to the drop in filtered measurements at UE 102, which may lead UE 102 to assume that the serving cell (e.g., base station 122) is weaker than the neighbor cell (e.g., base station 172) for a time to trigger (TTT) duration (e.g., 160 ms, although not limited to this value), thereby resulting in triggering a handover.

Figure 4:
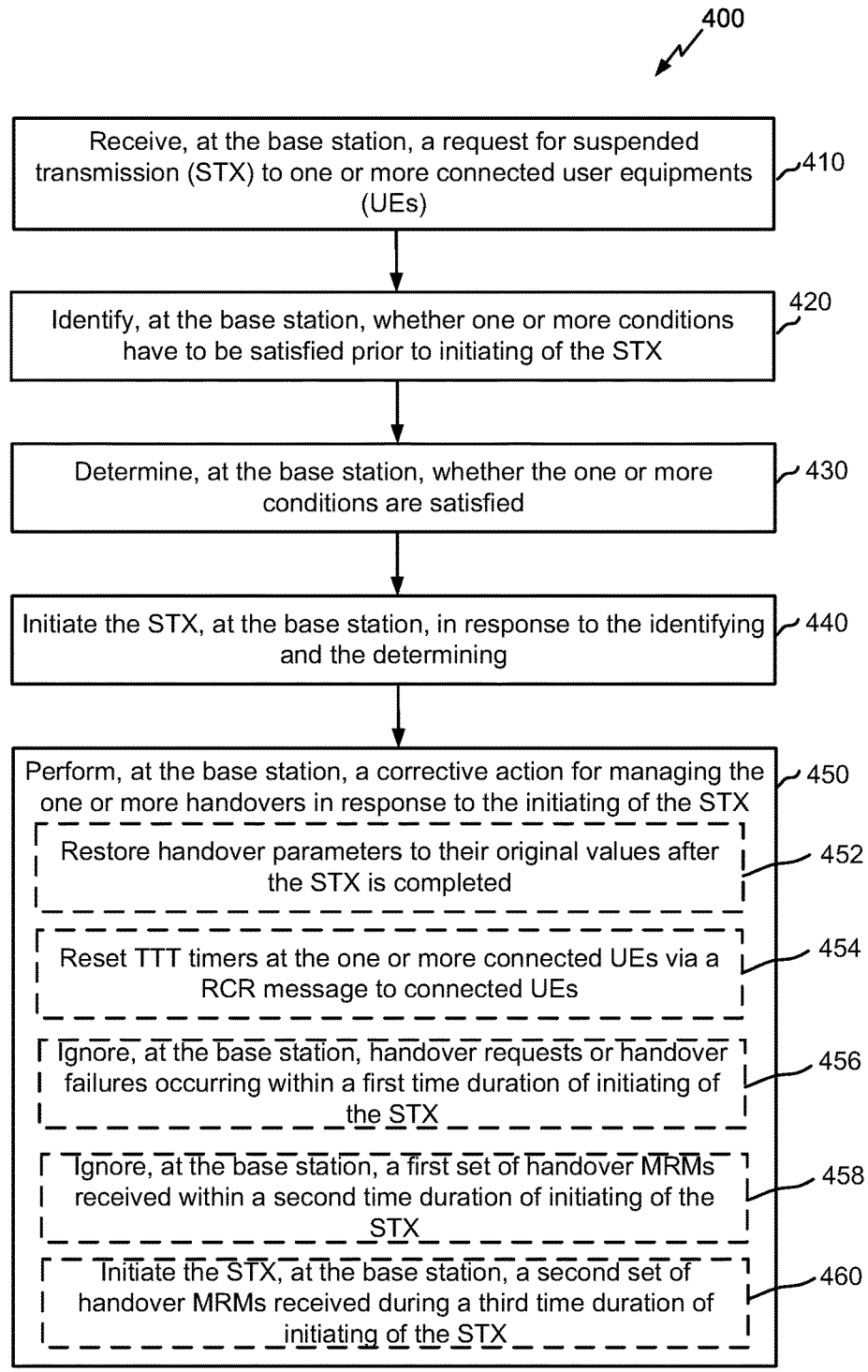
FIG. 4 illustrating an example method for managing handovers at a base station, in accordance with aspects of the present disclosure.

FIG. 4 is a flowchart illustrating a method 400 for managing handovers at a base station.

In an aspect, at block 410, methodology 400 may include receiving, at the base station, a request for suspended transmission (STX) to one or more connected user equipments (UEs). For example, in an aspect, base station 122 and/or STX manager 124 may include STX request receiving component 132, such as a specially programmed processor module, or a processor executing specially programmed code stored in a memory, to receive at base station 122, a request for suspended transmission (STX) to one or more connected user equipments (UEs) (e.g., UEs 102 and/or 104). In an aspect, the request may be associated with a network listen (NL) operation at the base station.

As described above in reference to FIGS. 1 and 2, STX manager 124 and/or STX request receiving component 132 may receive a request from NL component 160 to suspend DL transmission from base station 122 to the UEs (e.g., UEs 102 and 104) for an NL period so that the NL component 160 may listen to neighbor base stations and perform RF measurements. For instance, NL component 160 may be a part of transceiver 166 (e.g., integrated receiver) or a separate receiver for performing RF measurements.

For example, network listen (NL) period, NL operation, or NL mode refers to a mechanism in which a base station (e.g. base station 122) stops transmitting (e.g., temporarily) and utilizes an integrated UE receiver functionality to measure downlink signals transmitted from other base stations (e.g., base station 172). In general, the NL mechanism may be used with small cells, which are typically controlled by a centralized network entity (such as an OA&M system), for centralized network optimization. Additionally, the NL measurements may be used locally at the small cells for auto-configuration purposes.

In an aspect, at block 420, methodology 400 may include identifying, at the base station, whether one or more conditions have to be satisfied prior to initiating of the STX. For example, in an aspect, base station 122 and/or STX manager 124 may include a condition identifying component 134, such as a specially programmed processor module, or a processor executing specially programmed code stored in a memory, to identify at base station 122 whether one or more conditions have to be satisfied prior to initiating of the STX.

For instance, in an aspect, base station 122 and/or STX manager 124 may operate condition identifying component 134 to identify one or more conditions prior to initiating the STX at base station 122. The one or more conditions may be stored in memory 162, and may include one or more of: whether the number of UEs connected to base station 122 is below a threshold, and/or whether a period associated with the initiating of the STX aligns (e.g., in sync) with a connected mode discontinuous reception (CDRX) off ("OFF") period of the UEs. In an aspect, base station 122 and/or STX manager 124 may define these conditions as pre-requisites at STX manager 124 for initiating the STX at base station 122. In an additional aspect, these conditions or pre-requisites may be dynamically modified by the network operator and/or new conditions or pre-requisites may be added by the network operator.

In an aspect, at block 430, methodology 400 may include determining, at the base station, whether the one or more conditions are satisfied. For example, in an aspect, base station 122 and/or STX manager 124 may include condition satisfied determining component 136, such as a specially programmed processor module, or a processor executing specially programmed code stored in a memory, to determine, at base station 122 whether the one or more conditions are satisfied. For instance, base station 122 and/or STX manager 124 and/or condition satisfied determining component 136 may determine whether the number of UEs connected to base station 122 is below a threshold by querying a controller of base station 122. If the received response is positive (i.e., number of connected UEs below the threshold), base station 122 and/or STX manager 124 and/or condition satisfied determining component 136 may determine that the condition for initiating the STX is satisfied. In an additional aspect, the threshold may be defined or set by a network operator (e.g., via STX manager 124) and the threshold may vary based on the day of the week, time of the day, etc. to minimize the impact of the STX at base station 122.

In an additional or optional aspect, base station 122 and/or STX manager 124 and/or condition satisfied determining component 136 may determine the condition as unsatisfied or not satisfied if the number of connected UEs is equal to or above the threshold resulting in a delay (e.g., next transmission time interval (TTI)) of initiating the STX at base station. However, delaying the STX for too long may negatively impact the performance of the network. Therefore, a maximum time period that the STX may be delayed may be defined at STX manager 124 and stored in memory 162 by the network operator. For instance, if the STX at base station 122 has been delayed for greater than the maximum time period defined, base station 122 and/or STX manager 124 may mark the condition as satisfied which may allow initiating of the STX at base station 122, if other conditions are met as described above/below.

In an additional aspect, base station 122 and/or STX manager 124 and/or condition satisfied determining component 136 may determine the condition as satisfied when the STX period is aligned with the CDRX off period of the UEs. This provides for initiating of the STX when the UEs are in the CDRX off period and are not expecting any transmissions on the DL from base station 122. For instance, STX manager 124 may query the CDRX alignment component 142 which is aware of the CDRX off period to find out the CDRX off period and/or to determine whether the condition is satisfied or not based on the STX time period (i.e., when the STX is going to be initiated).

In an aspect, at block 440, methodology 400 may include initiating the STX, at the base station, in response to the identifying and the determining. For example, in an aspect, base station 122 and/or STX manager 124 may include STX initiating component 138, such as a specially programmed processor module, or a processor executing specially programmed code stored in a memory, to initiate the STX at base station 122 in response to the identifying and the determining. In an aspect, STX manager 124 and/or STX initiating component 138 may initiate the STX at base station 122 by suspending DL transmission (e.g., suspending transmission on DL 152 to UE 102) at base station 122 by sending a message to transceiver 166 to shut down the transmitter.

In an aspect, at block 450, methodology 400 may include performing, at the base station, a corrective action for managing the handovers in response to the initiating of the STX. For example, in an aspect, base station 122 and/or STX manager 124 may include corrective action component 150, such as a specially programmed processor module, or a processor executing specially programmed code stored in a memory, to perform a corrective action for managing the handovers in response to the initiating of the STX. For instance, in an aspect, STX manager 124 and/or corrective action component 150 may perform a corrective action for managing the handovers.

In an example of performing a corrective action, at block 452, methodology 400 may optionally include restoring handover parameters to their original values after the STX is completed, if the handover parameters are set to higher values prior to the STX. That is, prior to the STX, base station 122 and/or STX manager 124 and/or corrective action component 150 may execute handover parameter setting component 144 to modify (or set) handover parameters that trigger handover of the UEs to higher values relative to original values so that the UEs stay on the current serving cell (e.g., base station 122) longer when compared to the time the UEs may stay on the current serving cell based on the original parameters. This reduces (e.g., minimizes, avoids, etc.) handovers that may be triggered during the STX of the base station 122. After the STX, base station 122 and/or STX manager 124 and/or corrective action component 150 may execute handover parameter setting component 144 to restore or reset the handover parameters to their original values to reduce the long term effects on the network performance. In an additional aspect, prior to performing the STX, base station 122 and/or STX manager 124 and/or corrective action component 150 may execute handover parameter setting component 144 to set the handover parameters to values having an expiration time (e.g., stored in memory 162) so that there is no need to reset (or restore) the handover parameters to the original values after the STX. This may include changes to the messaging format between the base station and the UEs to indicate the expiration time.

For instance, STX manager 124 and/or corrective action component 150 may execute handover parameter setting component 144 to set handover parameters (e.g., TTT, offsets, hysteresis, etc.) to higher values relative to the original values to minimize the number of handovers that may be triggered once the STX is initiated at the base station. For example, when the TTT timer is temporarily increased to 250 ms (e.g., from 160 ms, although not limited to this value), the handovers may be delayed and/or the number of handovers may be reduced. Additionally, when the offsets are increased (e.g., increased from 3 dB to 4 dB), the handover of the UEs may be delayed and/or an impact of such handovers on the network may be minimized. Additionally, STX manager 124 and/or corrective action component 150 may execute handover parameter setting component 144 to restore the handover parameters to their original values after the completion of the STX, such as when base station 122 resumes transmitting on the DL to the UEs.

In another example of performing a corrective action, at block 454, methodology 400 may optionally include resetting time-to-trigger (TTT) timers at the one or more connected UEs via a radio resource control (RRC) connection reconfiguration (RCR) message to the one or more connected UEs. For example, in an aspect, STX manager 124 and/or corrective action component 150 may execute RCR component 146 to send the RCR message to reset the TTT timers after the STX so that the UEs wait for a little longer before triggering a handover. For instance, a handover may be triggered at UE 102 if the strength of the serving cell (e.g., base station 122) is below 3 dB for 160 ms. Once STX is initiated at base station 122 and the base station 122 stops transmitting on the DL, the TTT timer at the UE starts counting down and triggers a handover of the UE when the timer expires. However, in an aspect, to delay the handover, STX manager 124 and/or corrective action component 150 may execute RCR component 146 to transmit the RCR message to the UEs (after the STX) to reset the TTT timer so that the UE has more time (e.g., 160 ms from the time the RCR message is received at the UE) before a handover is triggered.

In another example of performing a corrective action, at block 456, methodology 400 may optionally include ignoring handover requests or handover failures occurring within a first time duration ("T1"), e.g., 1 second (although not limited to this value), of initiating of the STX. For example, in an aspect, STX manager 124 and/or corrective action component 150 may execute message ignoring component 148 to ignore handover requests or handover failures messages so that the associated algorithms for resource allocation and mobility management do not take into consideration the handover requests or failures triggered during the first time duration. The handovers requests or failure messages are ignored for internal computations related to algorithms for resource allocation and mobility management but do not affect counters/logs maintained at the base stations and/or the UEs for monitoring network performance. In an additional aspect, the first time duration may be defined by the network operator and/or may be defined based on the type of the base station, e.g., a macro cell, a small cell, etc.

In another example of performing a corrective action, at block 458, methodology 400 may optionally include ignoring a first set of handover measurement report messages (MRMs) received within a second time duration ("T2") of initiating of the STX. For example, in an aspect, base station 122 and/or STX manager 124 may operate message ignoring component 148 to perform a corrective action that may include ignoring MRMs which may be used by base station 122 for triggering handovers. By ignoring the MRMs received from the UEs, base station 122 and/or STX manager 124 and/or message ignoring component 148 do not trigger handover of the UEs. Further, the second time duration (T2), including a start time, may be set as a function of STX duration and TTT timers. Furthermore, in an additional or optional aspect, the second time duration may be defined by the network operator. In a further additional or optional aspect, first time duration and the second time duration may be the same time duration, overlap with each other, or occur one after the other.

In another example of performing a corrective action, at block 460, methodology 400 may optionally include ignoring a second set of handover MRMs received during a third time duration ("T3") of initiating of the STX, wherein the second set of handover MRMs are associated with a stronger serving base station. For example, in an aspect, base station 122 and/or STX manager 124 may operate message ignoring component 148 to perform a corrective action that may include ignoring a second set of handover MRMs received during a third time duration (T3) of initiating of the STX, wherein the second set of handover MRMs are associated with a stronger serving base station. For instance, base station 122 and/or STX manager 124 and/or message ignoring component 148 may ignore a second set of handover MRMs received from the UEs if the difference between the strength of the current serving base station (e.g., base station 122) and the neighbor base station (e.g., base station 172) is above a threshold (e.g., a signal difference threshold). In an aspect, the third time duration may be in the order of, e.g., 500 ms (although not limited to this value) and may be defined the network operators along with the threshold value. The ignoring of the second set of handover MRMs allows base station 122 to filter out periodic reports from the UEs following the first reports triggered due to the initiating of the STX.

In an additional or optional aspect, one or more of the first time duration, the second time duration, the third time duration, or the signal difference threshold may be a function of STX duration and TTT timers used by the UEs for handovers. In a further additional aspect, one or more of the corrective actions described above (e.g., any combination of the corrective actions) may be used for managing handovers at the base station to minimize or reduce the impact on network performance. As such, handovers that are initiated due to a STX at a base station may be managed to minimize, reduce, avoid the impact on network performance.

Figure 5:
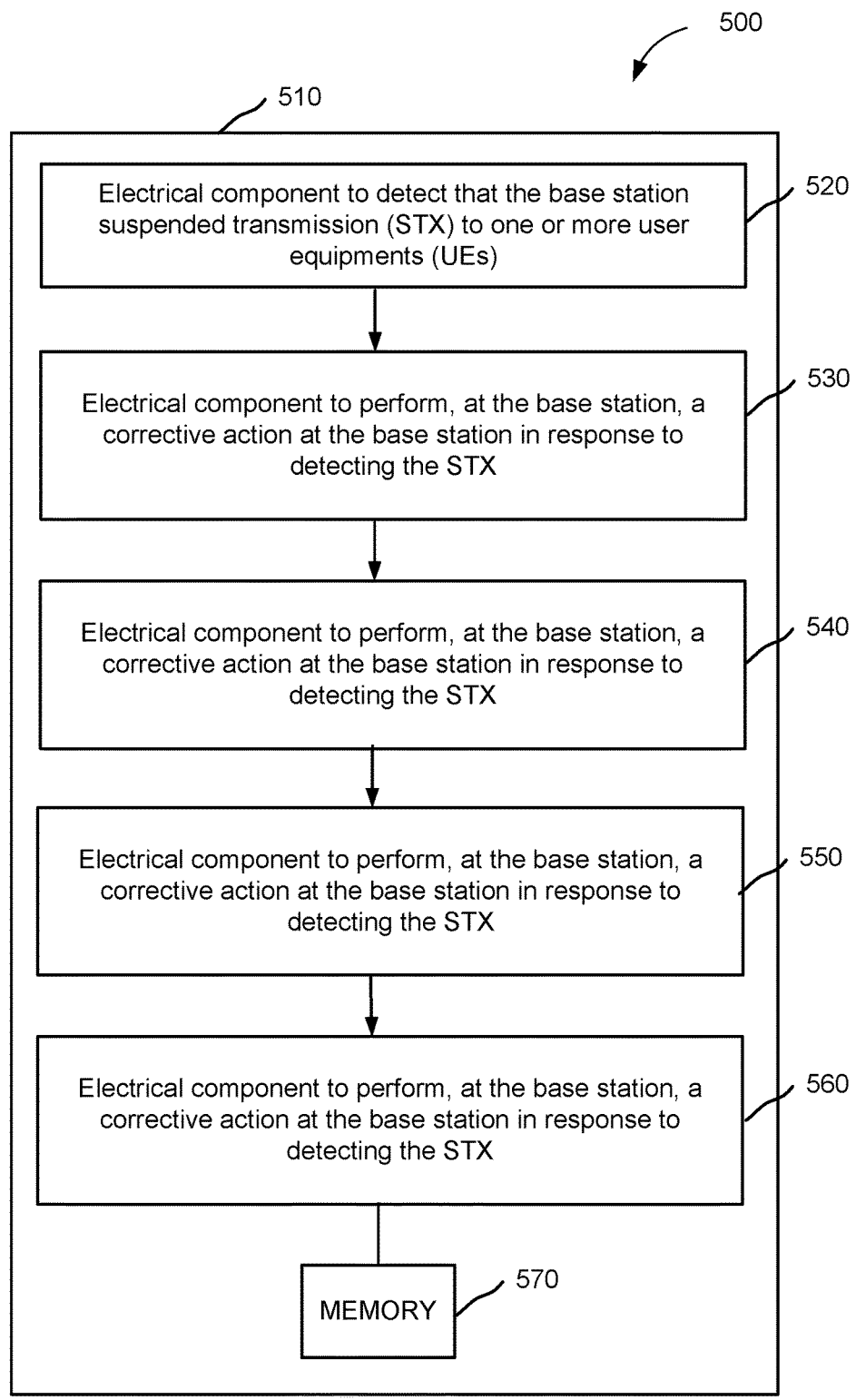
FIG. 5 illustrates an example system for managing handovers at a base station, in accordance with aspects of the present disclosure.

Referring to FIG. 5, an example system 500 is displayed for managing handovers at a base station.

For example, system 500 can reside at least partially within a base station, for example, base station 122 and/or STX manager 124 (FIG. 1). It is to be appreciated that system 500 is represented as including functional blocks, which can be functional blocks that represent functions implemented by a processor, software, or combination thereof (for example, firmware). System 500 includes a logical grouping 510 of electrical components that can act in conjunction.

For instance, logical grouping 510 may include an electrical component 520 to receive, at the base station, a request for suspended transmission (STX) to one or more connected user equipments (UEs). For example, in an aspect, electrical component 520 may comprise STX manager 124 and/or STX request receiving component 132 (FIG. 1).

Additionally, logical grouping 510 may include an electrical component 530 to identify, at the base station, whether one or more conditions have to be satisfied prior to initiating of the STX. For example, in an aspect, electrical component 530 may comprise STX manager 124 and/or condition identifying component 134 (FIG. 1).

Additionally, logical grouping 510 may include an electrical component 540 to determine, at the base station, whether the one or more conditions are satisfied. For example, in an aspect, electrical component 540 may comprise STX manager 124 and/or condition satisfied determining component 136 (FIG. 1).

Additionally, logical grouping 510 may include an electrical component 550 to initiate the STX, at the base station, in response to the identifying and the determining. For example, in an aspect, electrical component 550 may comprise STX manager 124 and/or STX initiating component 138 (FIG. 1).

Additionally, logical grouping 510 may include an electrical component 560 to perform, at the base station, a corrective action for managing the handovers in response to the initiating of the STX. For example, in an aspect, electrical component 560 may comprise STX manager 124 and/or corrective action component 150 (FIG. 1).

Additionally, system 500 can include a memory 570 that retains instructions for executing functions associated with the electrical components 520, 530, 540, 550, and/or 560, stores data used or obtained by the electrical components 520, 530, 540, 550, and/or 560, etc. While shown as being external to memory 570, it is to be understood that one or more of the electrical components 520, 530, 540, 550, and/or 560 can exist within memory 570. In one example, electrical components 520, 530, 540, 550, and/or 560 can comprise at least one processor, or each electrical component 520, 530, 540, 550, and/or 560 can be a corresponding module of at least one processor. Moreover, in an additional or alternative example, electrical components 520, 530, 540, 550, and/or 560 can be a computer program product including a computer readable medium, where each electrical component 520, 530, 540, 550, and/or 560 can be corresponding code.

Figure 6:
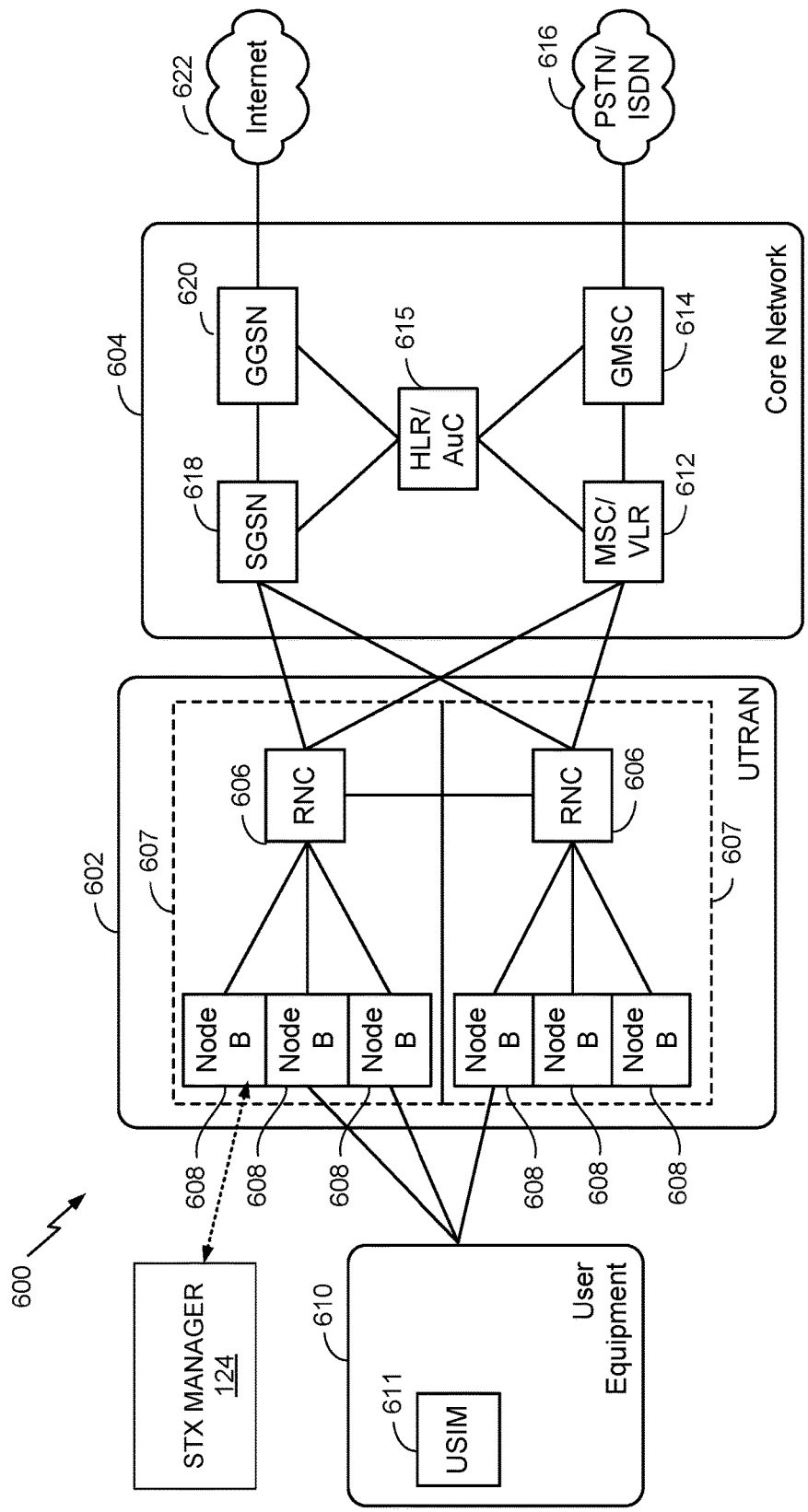
FIG. 6 is a block diagram conceptually illustrating an example of a telecommunications system, including aspects of the system of FIG. 1.

FIG. 6 is a block diagram conceptually illustrating an example of a telecommunications system, including aspects of the system of FIG. 1. By way of example and without limitation, the aspects of the present disclosure illustrated in FIG. 6 are presented with reference to a UMTS system 600 employing a W-CDMA air interface and may include base station 122 executing an aspect of STX manager 124 (FIG. 1). The networks described above that include a base station 122 having a STX manager 124 may be part of or may be associated with a system such as UMTS system 600. A UMTS network includes three interacting domains: a Core Network (CN) 604, a UMTS Terrestrial Radio Access Network (UTRAN) 602 which may include NodeB 608 (which may be an example of base station 122) and User Equipment (UE) 610 (which may be an example of UEs 102 and/or 104 of FIG. 1). In this example, the UTRAN 602 provides various wireless services including telephony, video, data, messaging, broadcasts, and/or other services. The UTRAN 602 may include a plurality of Radio Network Subsystems (RNSs) such as an RNS 607, each controlled by a respective Radio Network Controller (RNC) such as an RNC 606. Here, the UTRAN 602 may include any number of RNCs 606 and RNSs 607 in addition to the RNCs 606 and RNSs 607 illustrated herein. The RNC 606 is an apparatus responsible for, among other things, assigning, reconfiguring and releasing radio resources within the RNS 607. The RNC 606 may be interconnected to other RNCs (not shown) in the UTRAN 602 through various types of interfaces such as a direct physical connection, a virtual network, or the like, using any suitable transport network.

Communication between a UE 610 and a NodeB 608 may be considered as including a physical (PHY) layer and a medium access control (MAC) layer. Further, communication between a UE 610 and an RNC 606 by way of a respective NodeB 608 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in Radio Resource Control (RRC) Protocol Specification, 3GPP TS 25.331 v9.1.0, incorporated herein by reference.

The geographic region covered by the SRNS 607 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three NodeBs 608 are shown in each SRNS 607; however, the SRNSs 607 may include any number of wireless NodeBs. The NodeBs 608 provide wireless access points to a core network (CN) 604 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 610 may further include a universal subscriber identity module (USIM) 611, which contains a user's subscription information to a network. For illustrative purposes, one UE 610 is shown in communication with a number of the NodeBs 608. The downlink (DL), also called the forward link, refers to the communication link from a NodeB 608 to a UE 610, and the uplink (UL), also called the reverse link, refers to the communication link from a UE 610 to a NodeB 608.

The core network 604 interfaces with one or more access networks, such as the UTRAN 602. As shown, the core network 604 is a GSM core network. However, as those skilled in the art will recognize, the various concepts presented throughout this disclosure may be implemented in a RAN, or other suitable access network, to provide UEs with access to types of core networks other than GSM networks.

The core network 604 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 604 supports circuit-switched services with a MSC 612 and a GMSC 614. In some applications, the GMSC 614 may be referred to as a media gateway (MGW). One or more RNCs, such as the RNC 606, may be connected to the MSC 612. The MSC 612 is an apparatus that controls call setup, call routing, and UE mobility functions. The MSC 612 also includes a visitor location register (VLR) that contains subscriber-related information for the duration that a UE is in the coverage area of the MSC 612. The GMSC 614 provides a gateway through the MSC 612 for the UE to access a circuit-switched network 616. The core network 604 includes a home location register (HLR) 615 containing subscriber data, such as the data reflecting the details of the services to which a particular user has subscribed. The HLR is also associated with an authentication center (AuC) that contains subscriber-specific authentication data. When a call is received for a particular UE, the GMSC 614 queries the HLR 615 to determine the UE's location and forwards the call to the particular MSC serving that location.

The core network 604 also supports packet-data services with a serving GPRS support node (SGSN) 618 and a gateway GPRS support node (GGSN) 620. GPRS, which stands for General Packet Radio Service, is designed to provide packet-data services at speeds higher than those available with standard circuit-switched data services. The GGSN 620 provides a connection for the UTRAN 602 to a packet-based network 622. The packet-based network 622 may be the Internet, a private data network, or some other suitable packet-based network. The primary function of the GGSN 620 is to provide the UEs 610 with packet-based network connectivity. Data packets may be transferred between the GGSN 620 and the UEs 610 through the SGSN 618, which performs primarily the same functions in the packet-based domain as the MSC 612 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a NodeB 608 and a UE 610. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 7:
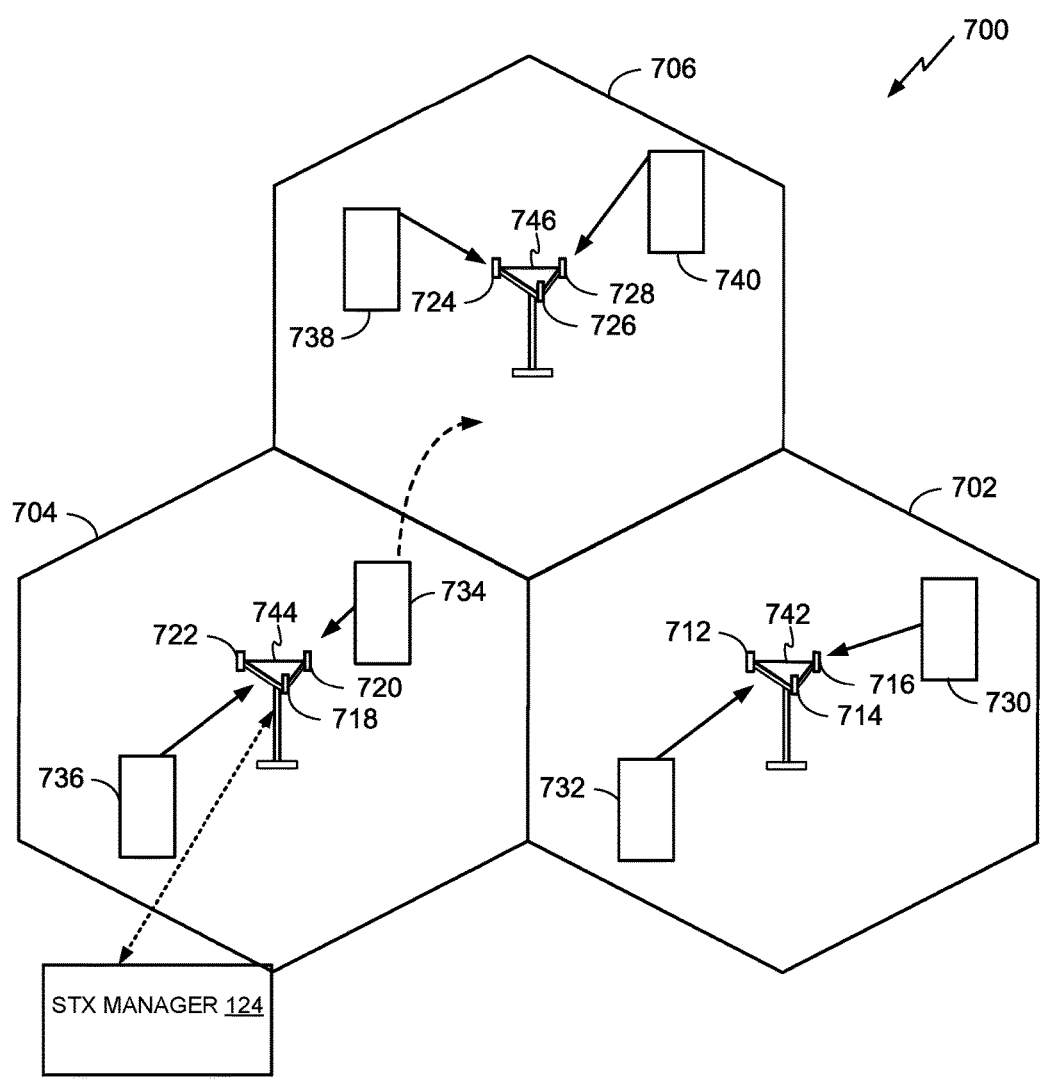
FIG. 7 is a conceptual diagram illustrating an example of an access network for use with a UE, in accordance with an aspect of the present disclosure.

Referring to FIG. 7, an access network 700 in UTRAN architecture is illustrated, and may include cells 702, 704, and 706, which be the same as or similar to base station 122

(FIG. 1) in that it is configured to include STX manager 124 (FIG. 7; for example, illustrated here as being associated with cell 704/base station 744 for managing handovers) and/or UEs 730, 732, 734, 736, 738, and/or 740. The multiple sectors can be formed by groups of antennas with each antenna responsible for communication with UEs in a portion of the cell. For example, in cell 702, antenna groups 712, 714, and 716 may each correspond to a different sector. In cell 704, antenna groups 718, 720, and 722 each correspond to a different sector. In cell 706, antenna groups 724, 726, and 728 each correspond to a different sector. The cells 702, 704, and 706 may include several wireless communication devices, e.g., User Equipment or UEs, which may be in communication with one or more sectors of each cell 702, 704, or 706. For example, UEs 730 and 732 may be in communication with NodeB 742, UEs 734 and 736 may be in communication with NodeB 744, and UEs 738 and 740 can be in communication with NodeB 746. Here, each NodeB 742, 744, and 746 is configured to provide an access point to a CN 604 (see FIG. 6) for all the UEs 730, 732, 734, 736, 738, and 740 in the respective cells 702, 704, and 706. UEs 730, 732, 734, 736, 738, and 740 may be similar to UEs 102 and/or 104 described above, and NodeBs 742, 744, and/or 746 can correspond to base station 122 described in, for example, FIG. 1.

As the UE 734 moves from the illustrated location in cell 704 into cell 706, a serving cell change (SCC) or handover may occur in which communication with the UE 734 transitions from the cell 704, which may be referred to as the source cell to cell 706, which may be referred to as the target cell. Management of the handover procedure may take place at the UE 734, at the NodeBs corresponding to the respective cells, at a radio network controller 606 (see FIG. 6), or at another suitable node in the wireless network. For example, during a call with the source cell 704, or at any other time, the UE 734 may monitor various parameters of the source cell 704 as well as various parameters of neighboring cells such as cells 706 and 702. Further, depending on the quality of these parameters, the UE 734 may maintain communication with one or more of the neighboring cells. During this time, the UE 734 may maintain an Active Set, that is, a list of cells that the UE 734 is simultaneously connected to (i.e., the UTRA cells that are currently assigning a downlink dedicated physical channel (DPCH) or fractional downlink dedicated physical channel (F-DPCH) to the UE 734 may constitute the Active Set).

The modulation and multiple access scheme employed by the access network 700 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 8:
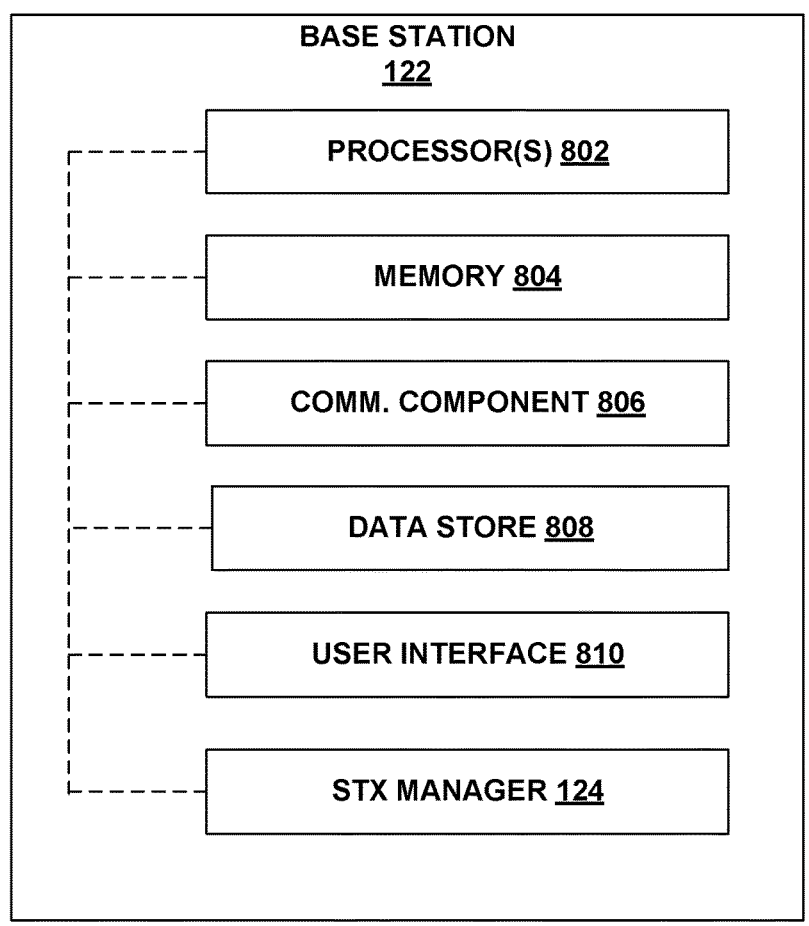
FIG. 8 is a block diagram conceptually illustrating an example hardware implementation for an apparatus employing a processing system configured in accordance with an aspect of the present disclosure.

Referring to FIG. 8, in an aspect, base station 122, for example, including STX manager 124, may be or may include a specially programmed or configured computer device to perform the functions described herein. In one aspect of implementation, base station 122 and/or STX manager 124 may include one or more of the following components: STX request receiving component 132, condition identifying component 134, condition satisfied determining component 136, STX initiating component 138, connected UE determining component 140, CDRX alignment component 142, handover parameter setting component 144, RCR component 146, message ignoring component 148, corrective action component 150, NL component 160, memory 162, processor 164, and/or transceiver 166 for managing handovers at the base station.

In an aspect, for example as represented by the dashed lines, STX manager 124 may be implemented in or executed using one or any combination of processor 802 (same or similar to processor 164), memory 804 (same or similar to memory 162), communications component 806, and data store 808. For example, STX manager 124 may be executed on one or more processors 802. Further, for example, STX manager 124 may be defined as a computer-readable medium stored in memory 804 and/or data store 808 and executed by processor 802. Moreover, for example, inputs and outputs relating to operations of STX manager 124 may be provided or supported by communications component 806, which may provide a bus between the components of computer device 800 or an interface for communication with external devices or components.

Base station 122 may include processor 802 specially configured to carry out processing functions associated with one or more of components and functions described herein. Processor 802 can include a single or multiple set of processors or multi-core processors. Moreover, processor 802 can be implemented as an integrated processing system and/or a distributed processing system.

Base station 122 further includes memory 804, such as for storing data used herein and/or local versions of applications and/or instructions or code being executed by processor 802, such as to perform the respective functions of the respective entities described herein. Memory 804 can include any type of memory usable by a computer, such as random access memory (RAM), read only memory (ROM), tapes, magnetic discs, optical discs, volatile memory, non-volatile memory, and any combination thereof.

Further, base station 122 includes communications component 806 that provides for establishing and maintaining communications with one or more parties utilizing hardware, software, and services as described herein. Communications component 806 may carry communications between components on base station 122, as well as between user and external devices, such as devices located across a communications network and/or devices serially or locally connected to base station 122. For example, communications component 806 may include one or more buses, and may further include transmit chain components and receive chain components associated with a transmitter and receiver, respectively, or a transceiver, operable for interfacing with external devices.

Additionally, base station 122 may further include data store 808, which can be any suitable combination of hardware and/or software, that provides for mass storage of information, databases, and programs employed in connection with aspects described herein. For example, data store 808 may be a data repository for applications not currently being executed by processor 802.

Base station 122 may additionally include a user interface component 810 operable to receive inputs from a user of base station 122, and further operable to generate outputs for presentation to the user. User interface component 810 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 810 may include one or more output devices, including but not limited to a display, a speaker, a haptic feedback mechanism, a printer, any other mechanism capable of presenting an output to a user, or any combination thereof.

The various concepts presented throughout this disclosure may be implemented across a broad variety of telecommunication systems, network architectures, and communication standards.

Figure 9:
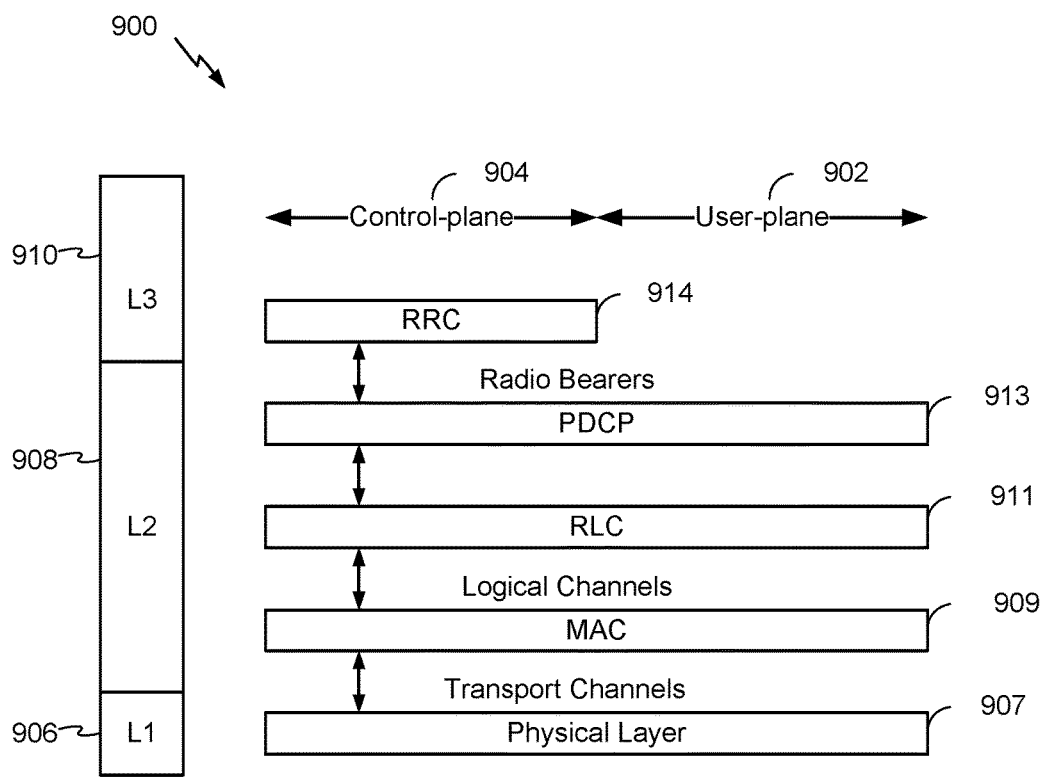
FIG. 9 is a conceptual diagram illustrating an example of a radio protocol architecture for the user and control planes for a base station and/or a UE, in accordance with an aspect of the present disclosure.

FIG. 9 is a conceptual diagram illustrating an example of the radio protocol architecture 900 for the user plane 902 and the control plane 904 of a base station or a UE. The architecture 900 may be used with the networks described herein that include base station 122 having an aspect of STX manager 124. For example, architecture 900 may be included in a network entity 120, base station 122, and/or UEs 102 and/or 104, such as the ones described in FIGS. 1, and 6-8. The radio protocol architecture 900 for the base station and the UE is shown with three layers: Layer 1 906, Layer 2 908, and Layer 3 910. Layer 1 906 is the lowest lower and implements various physical layer signal processing functions. As such, Layer 1 906 includes the physical layer 907. Layer 2 (L2 layer) 908 is above the physical layer 907 and is responsible for the link between the AP and UE over the physical layer 907. Layer 3 (L3 layer) 910 includes a radio resource control (RRC) sublayer 914. The RRC sublayer 914 handles the control plane signaling of Layer 3 between the UE and the UTRAN.

In the user plane, the L2 layer 908 includes a media access control (MAC) sublayer 909, a radio link control (RLC) sublayer 911, and a packet data convergence protocol (PDCP) 913 sublayer, which are terminated at the AP on the network side. Although not shown, the UE may have several upper layers above the L2 layer 908 including a network layer (e.g., IP layer) that is terminated at a PDN gateway on the network side, and an application layer that is terminated at the other end of the connection (e.g., far end UE, server, etc.).

The PDCP sublayer 913 provides multiplexing between different radio bearers and logical channels. The PDCP sublayer 913 also provides header compression for upper layer data packets to reduce radio transmission overhead, security by ciphering the data packets, and handover support for UEs between NodeBs. The RLC sublayer 911 provides segmentation and reassembly of upper layer data packets, retransmission of lost data packets, and reordering of data packets to compensate for out-of-order reception due to hybrid automatic repeat request (HARQ). The MAC sublayer 909 provides multiplexing between logical and transport channels. The MAC sublayer 909 is also responsible for allocating the various radio resources (e.g., resource blocks) in one cell among the UEs. The MAC sublayer 909 is also responsible for HARQ operations.

Figure 10:
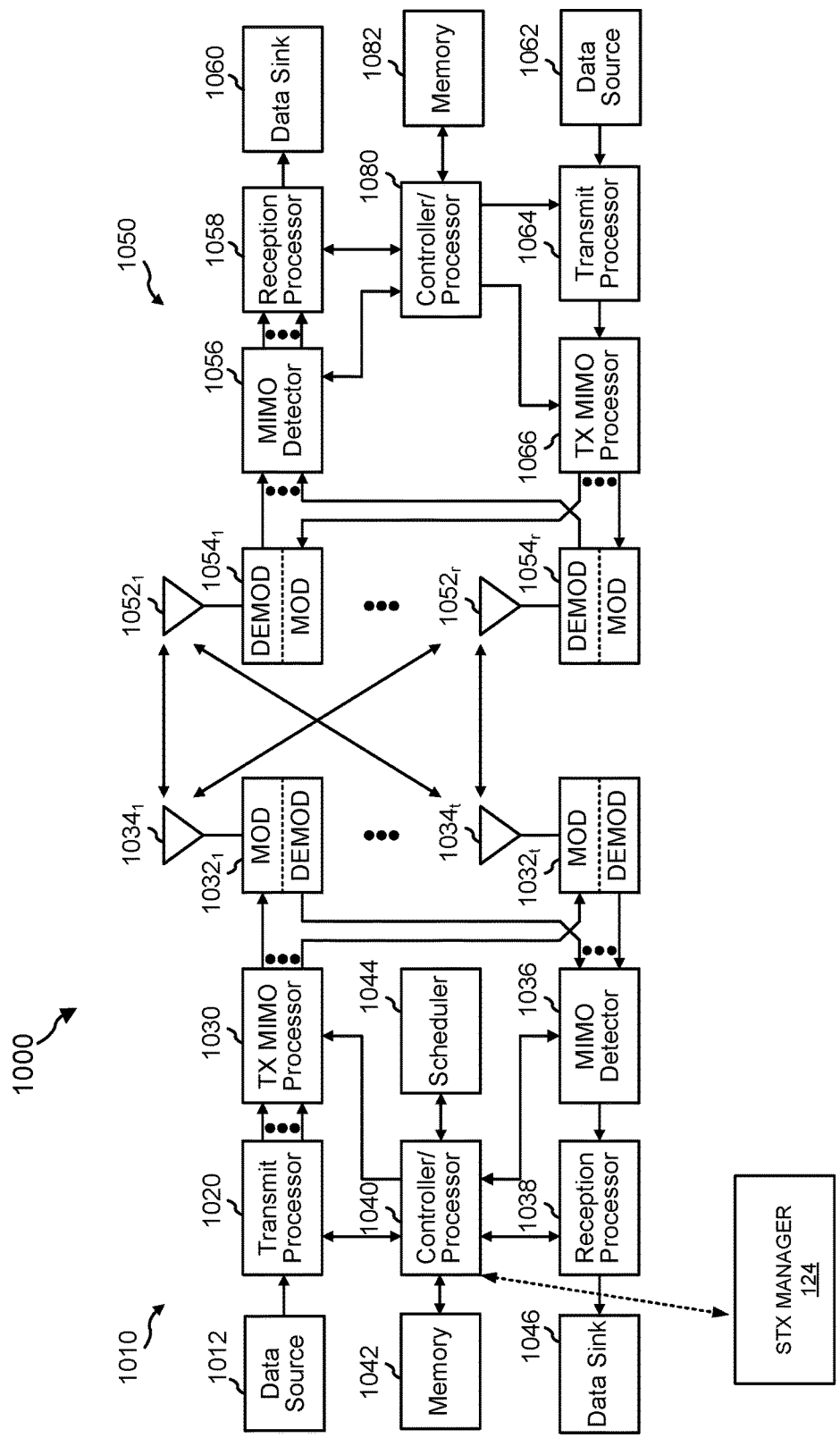
FIG. 10 is a block diagram conceptually illustrating examples of an eNodeB and a UE configured in accordance with an aspect of the present disclosure.

FIG. 10 is a block diagram 1000 conceptually illustrating examples of an eNodeB 1010 and a UE 1050 configured in accordance with an aspect of the present disclosure, wherein the eNodeB may be base station (e.g., configured to include a STX manager 124). For example, the base station/eNodeB 1010 and the UE 1050 of a system 1000, as shown in FIG. 10, may be the base station and the UE in FIGS. 1 and 6-8. The base station 1010 may be equipped with antennas $1034_{1-t}$, and the UE 1050 may be equipped with antennas $1052_{1-r}$, wherein t and r are integers greater than or equal to one.

At the base station 1010, a base station transmit processor 1020 may receive data from a base station data source 1012 and control information from a base station controller/processor 1040. The control information may be carried on the PBCH, PCFICH, PHICH, PDCCH, etc. The data may be carried on the PDSCH, etc. The base station transmit processor 1020 may process (e.g., encode and symbol map) the data and control information to obtain data symbols and control symbols, respectively. The base station transmit processor 1020 may also generate reference symbols, e.g., for the PSS, SSS, and cell-specific reference signal (RS). A base station transmit (TX) multiple-input multiple-output (MIMO) processor 1030 may perform spatial processing (e.g., precoding) on the data symbols, the control symbols, and/or the reference symbols, if applicable, and may provide output symbol streams to the base station modulators/demodulators (MODs/DEMODs) $1032_{1-t}$. Each base station modulator/demodulator 1032 may process a respective output symbol stream (e.g., for OFDM, etc.) to obtain an output sample stream. Each base station modulator/demodulator 1032 may further process (e.g., convert to analog, amplify, filter, and upconvert) the output sample stream to obtain a downlink signal. Downlink signals from modulators/demodulators $1032_{1-t}$ may be transmitted via the antennas $1034_{1-t}$, respectively.

At the UE 1050, the UE antennas $1052_{1-r}$ may receive the downlink signals from the base station 1010 and may provide received signals to the UE modulators/demodulators (MODs/DEMODs) $1054_{1-r}$, respectively. Each UE modulator/demodulator 1054 may condition (e.g., filter, amplify, downconvert, and digitize) a respective received signal to obtain input samples. Each UE modulator/demodulator 1054 may further process the input samples (e.g., for OFDM, etc.) to obtain received symbols. A UE MIMO detector 1056 may obtain received symbols from all the UE modulators/demodulators 105414 and perform MIMO detection on the received symbols if applicable, and provide detected symbols. A UE reception processor 1058 may process (e.g., demodulate, deinterleave, and decode) the detected symbols, provide decoded data for the UE 1050 to a UE data sink 1060, and provide decoded control information to a UE controller/processor 1080.

On the uplink, at the UE 1050, a UE transmit processor 1064 may receive and process data (e.g., for the PUSCH) from a UE data source 1062 and control information (e.g., for the PUCCH) from the UE controller/processor 1080. The UE transmit processor 1064 may also generate reference symbols for a reference signal. The symbols from the UE transmit processor 1064 may be precoded by a UE TX MIMO processor 1066 if applicable, further processed by the UE modulator/demodulators 105414 (e.g., for SC-FDM, etc.), and transmitted to the base station 1010. At the base station 1010, the uplink signals from the UE 1050 may be received by the base station antennas 1034, processed by the base station modulators/demodulators 1032, detected by a base station MIMO detector 1036 if applicable, and further processed by a base station reception processor 1038 to obtain decoded data and control information sent by the UE 1050. The base station reception processor 1038 may provide the decoded data to a base station data sink 1046 and the decoded control information to the base station controller/processor 1040.

The base station controller/processor 1040 and the UE controller/processor 1080 may direct the operation at the base station 1010 and the UE 1050, respectively. The base station controller/processor 1040 and/or other processors and modules at the base station 1010 may perform or direct, e.g., various processes for the techniques described herein (e.g., as illustrated in FIGS. 1-9). The base station memory 1042 and the UE memory 1082 may store data and program codes for the base station 1010 and the UE 1050, respectively. A scheduler 1044 may be used to schedule UE 1050 for data transmission on the downlink and/or uplink.

The various concepts presented throughout this disclosure may be implemented across a broad variety of telecommunication systems, network architectures, and communication standards.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm operations described in connection with the disclosure herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The step/operation of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for managing one or more handovers at a base station, comprising:
   receiving, at the base station, a request for suspended transmission (STX) to one or more connected user equipments (UEs);
   setting one or more handover parameters to new values higher than original values prior to the initiating of the STX;
   identifying, at the base station, whether one or more conditions have to be satisfied prior to initiating of the STX;
   determining, at the base station, whether the one or more conditions are satisfied;
   initiating the STX, at the base station, in response to the identifying and the deteiinining; and
   performing, at the base station, a corrective action for managing the one or more handovers in response to the initiating of the STX, wherein the corrective action comprises restoring the one or more handover parameters to the original values after the STX is completed.

2. The method of claim 1, wherein initiating the STX to the one or more connected UEs further comprises suspending downlink (DL) transmissions from the base station to the one or more connected UEs.

3. The method of claim 1, wherein the identifying comprises identifying a condition to be satisfied prior to the initiating of the STX, and wherein the determining comprises determining whether a number of the one or more connected UEs is below a threshold.

4. The method of claim 1, wherein the identifying comprises identifying a condition to be satisfied prior to the initiating of the STX, and wherein the determining comprises deteiniining whether a period associated with the STX aligns with a connected mode discontinuous reception (CDRX) off period of the one or more connected UEs.

5. The method of claim 1, wherein the initiating comprises initiating the STX during a connected mode discontinuous reception (CDRX) off period of the one or more connected UEs.

6. The method of claim 1, wherein performing the corrective action at the base station comprises:
resetting one or more time-to-trigger (TTT) timers at the one or more connected UEs via a radio resource control (RRC) connection reconfiguration (RCR) message to the one or more connected UEs,
ignoring, at the base station, handover requests or handover failures occurring within a first time duration of initiating of the STX,
ignoring, at the base station, a first set of handover measurement report messages (MRMs) received within a second time duration of initiating of the STX, or a combination thereof.

7. The method of claim 6, wherein perfoi fling the corrective action at the base station comprises:
ignoring, at the base station, a second set of handover MRMs received during a third time duration of initiating of the STX when a difference between signal strengths reported in a MRM of the base station and a neighbor base station is above a threshold.

8. The method of claim 1, wherein the request is associated with a network listen (NL) operation at the base station.

9. A base station for managing one or more handovers, comprising:
a memory configured to store data; and
one or more processors communicatively coupled with the memory, wherein the one or more processors and the memory are configured to:
receive, at the base station, a request for suspended transmission (STX) to one or more connected user equipments (UEs;
set one or more handover parameters to new values higher than original values prior to the initiating of the STX;
identify, at the base station, whether one or more conditions have to be satisfied prior to initiating of the STX;
determine, at the base station, whether the one or more conditions are satisfied;
initiate the STX, at the base station, in response to the identifying and the determining; and
perform, at the base station, a corrective action for managing the one or more handovers in response to the initiating of the STX, wherein the corrective action includes restoring the one or more handover parameters to the original values after the STX is completed.

10. The base station of claim 9, wherein the one or more processors and the memory are further configured to:
suspend downlink (DL) transmissions from the base station to the one or more connected UEs.

11. The base station of claim 9, wherein the one or more processors and the memory are further configured to identify a condition to be satisfied prior to the initiating of the STX and determine whether a number of the one or more connected UEs is below a threshold.

12. The base station of claim 9, wherein the one or more processors and the memory are further configured to identify a condition to be satisfied prior to the initiation of the STX and whether a period associated with the STX aligns with a connected mode discontinuous reception (CDRX) off period of the one or more connected UEs.

13. The base station of claim 9, wherein the initiating comprises initiating the STX during a connected mode discontinuous reception (CDRX) off period of the one or more connected UEs.

14. The base station of claim 9, wherein the one or more processors and the memory are further configured to:
reset time-to-trigger (TTT) timers at the one or more connected UEs via a radio resource control (RRC) connection reconfiguration (RCR) message to the one or more connected UEs,
ignore, at the base station, handover requests or handover failures occurring within a first time duration of initiating of the STX,
ignore, at the base station, a first set of handover measurement report messages (MRMs) received within a second time duration of initiating of the STX, or a combination thereof.

15. The base station of claim 14, wherein the one or more processors and the memory are further configured to ignore at the base station, a second set of handover MRMs received during a third time duration of initiating of the STX when a difference between signal strengths reported in a MRM of the base station and a neighbor base station is above a threshold.

16. The base station of claim 9, wherein the request is associated with a network listen (NL) operation at the base station.

17. A base station for managing one or more handovers, comprising:
means for receiving, at the base station, a request for suspended transmission (STX) to one or more connected user equipments (UEs);
means for setting one or more handover parameters to new values higher than original values prior to the initiating of the STX;
means for identifying, at the base station, whether one or more conditions have to be satisfied prior to initiating of the STX;
means for determining, at the base station, whether the one or more conditions are satisfied;
means for initiating the STX, at the base station, in response to the identifying and the determining; and
means for performing, at the base station, a corrective action for managing the one or more handovers in response to the initiating of the STX, wherein the corrective action comprises restoring the one or more handover parameters to the original values after the STX is completed.

18. The base station of claim 17, wherein the means for identifying comprises means for identifying a condition to be satisfied prior to the initiating of the STX and wherein the means for determining comprises means for determining whether a number of the one or more connected UEs is below a threshold.

19. The base station of claim 17, wherein the means for identifying comprises means for identifying a condition to be satisfied prior to the initiating of the STX and wherein the means for determining comprises means for determining whether a period associated with the STX aligns with a connected mode discontinuous reception (CDRX) off period of the one or more UEs.

20. The base station of claim 17, wherein the initiating comprises initiating the STX during a connected mode discontinuous reception (CDRX) off period of the one or more connected UEs.

21. The base station of claim 17, wherein the means for performing the corrective action at the base station comprises:
 means for resetting time-to-trigger (TTT) timers at the one or more connected UEs via a radio resource control (RRC) connection reconfiguration (RCR) message to the one or more connected UEs,
 means for ignoring, at the base station, handover requests or handover failures occurring within a first time duration of initiating of the STX,
 means for ignoring, at the base station, a first set of handover measurement report messages (MRMs) received within a second time duration of initiating of the STX, or
 a combination thereof.

22. The base station of claim 21, wherein the means for performing the corrective action at the base station comprises:
 means for ignoring, at the base station, a second set of handover MRMs received during a third time duration of initiating of the STX when a difference between signal strengths reported in a MRM of the base station and a neighbor base station is above a threshold.

23. The base station of claim 17, wherein the request is associated with a network listen (NL) operation at the base station.

24. A non-transitory computer readable medium storing computer executable code for managing one or more handovers at a base station, comprising:
 code for receiving, at the base station, a request for suspended transmission (STX) to one or more connected user equipments (UEs);
 code for setting one or more handover parameters to new values higher than original values prior to the initiating of the STX;
 code for identifying, at the base station, whether one or more conditions have to be satisfied prior to initiating of the STX;
 code for determining, at the base station, whether the one or more conditions are satisfied;
 code for initiating the STX, at the base station, in response to the identifying and the determining; and
 code for performing, at the base station, a corrective action for managing the one or more handovers in response to the initiating of the STX, wherein the corrective action comprises restoring the one or more handover parameters to the original values after the STX is completed.

25. The computer readable medium of claim 24, wherein the code for performing the corrective action at the base station comprises:
 code for ignoring, at the base station, handover requests or handover failures occurring within a first time duration of initiating of the STX,
 code for ignoring, at the base station, handover requests or handover failures occurring within a first time duration of initiating of the STX,
 code for ignoring, at the base station, a first set of handover measurement report messages (MRMs) received within a second time duration of initiating of the STX, or a combination thereof.

26. The computer readable medium of claim 25, wherein the code for performing the corrective action at the base station comprises:
 code for ignoring, at the base station, a second set of handover MRMs received during a third time duration of initiating of the STX when a difference between signal strengths reported in a MRM of the base station and a neighbor base station is above a threshold.

27. The computer readable medium of claim 24, wherein the request is associated with a network listen (NL) operation at the base station.

* * * * *